United States Patent [19]

Reid

[11] 4,273,655
[45] Jun. 16, 1981

[54] DOCTOR BLADE CLEANING METHOD AND APPARATUS

[75] Inventor: Robert A. Reid, Charlton City, Mass.

[73] Assignee: CPC Engineering Corporation, Sturbridge, Mass.

[21] Appl. No.: 102,235

[22] Filed: Dec. 10, 1979

[51] Int. Cl.³ .................. B01D 33/36; A46B 13/02
[52] U.S. Cl. ........................ 210/396; 15/256.51; 210/402
[58] Field of Search .............. 15/256.51; 34/112; 210/77, 374, 391, 396, 397, 402–404

[56] References Cited

U.S. PATENT DOCUMENTS

| 2,050,007 | 8/1936 | Keith, Jr. et al. | 210/403 X |
|---|---|---|---|
| 2,887,787 | 5/1959 | Barkley | 210/396 X |
| 3,113,890 | 12/1963 | Johnson et al. | 15/256.51 X |
| 3,520,410 | 7/1970 | Hutto, Jr. | 210/396 X |
| 3,869,389 | 3/1975 | Rokitansky | 210/402 X |
| 3,928,884 | 12/1975 | Sutter | 15/256.51 X |
| 4,146,484 | 3/1979 | Campbell | 210/402 X |
| 4,218,132 | 8/1980 | Iwai et al. | 15/256.51 X |

Primary Examiner—Robert H. Spitzer
Attorney, Agent, or Firm—Eugene E. Geoffrey, Jr.

[57] ABSTRACT

Doctor blade cleaning apparatus for the removal of solids accumulating thereon which includes a cleaning blade movable through an arcuate path and activating devices for moving the cleaning blade at least over the surface of the doctor blade and to a position away from the doctor blade for the discharge of solids removed therefrom.

10 Claims, 7 Drawing Figures

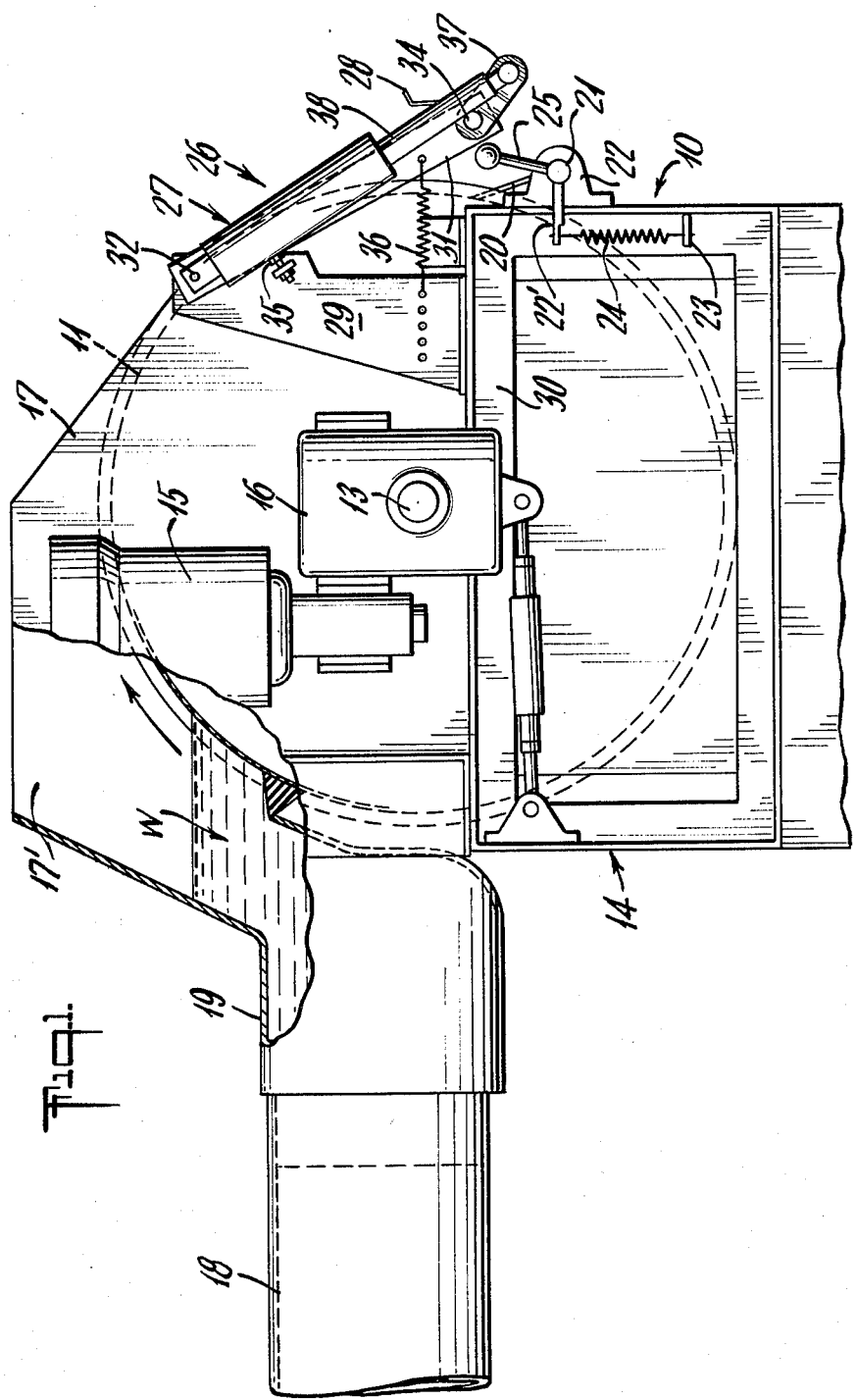

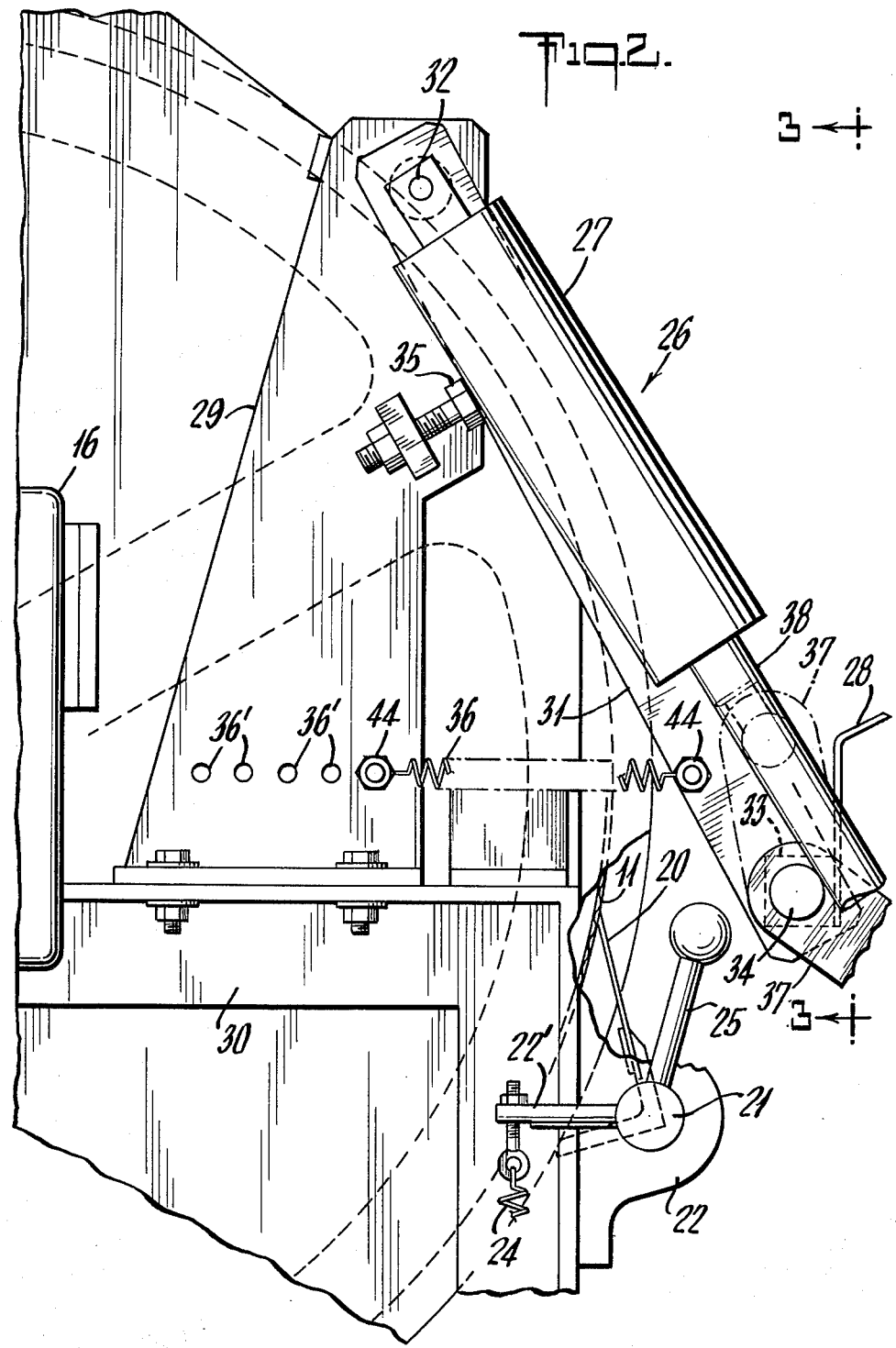

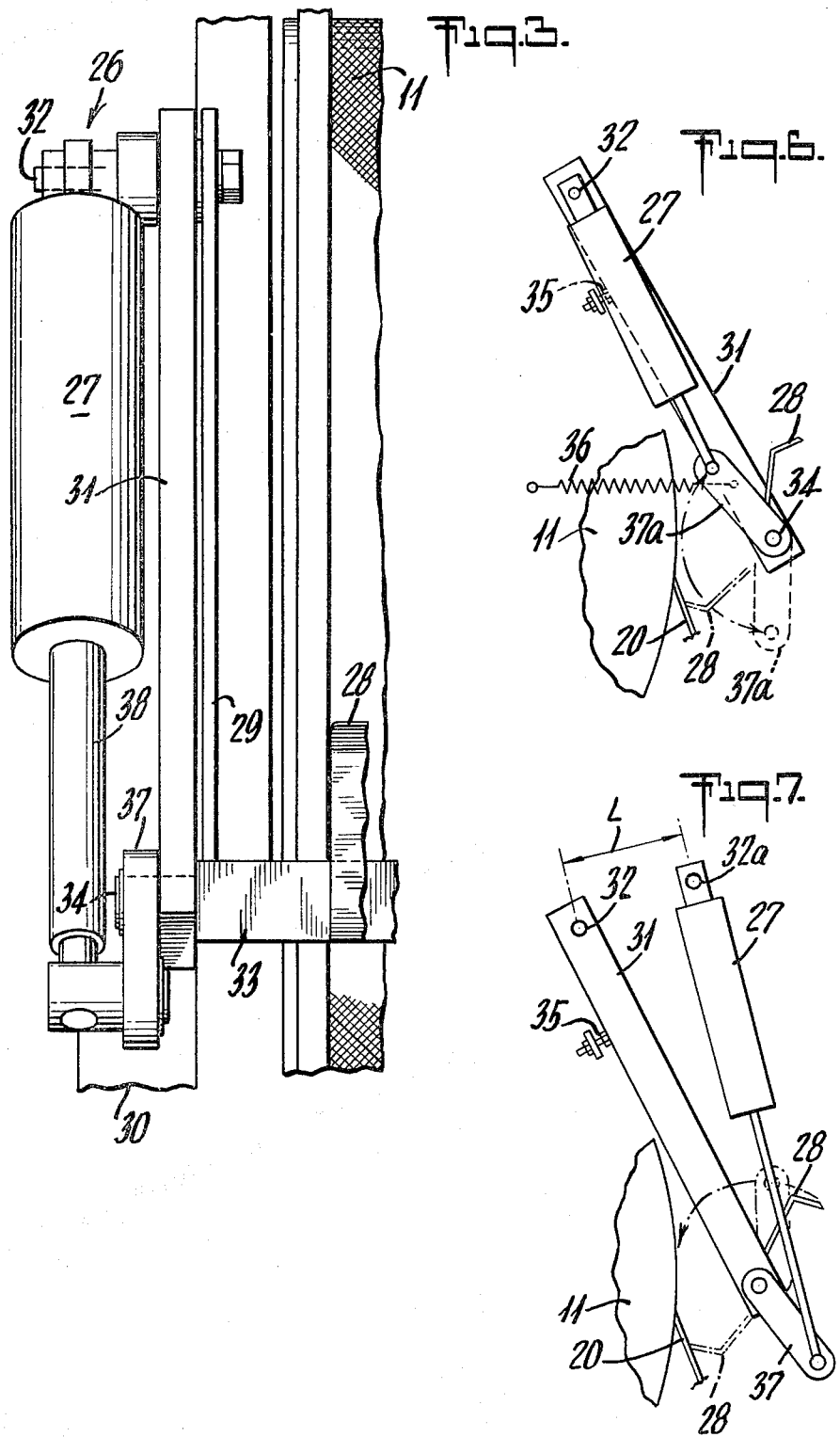

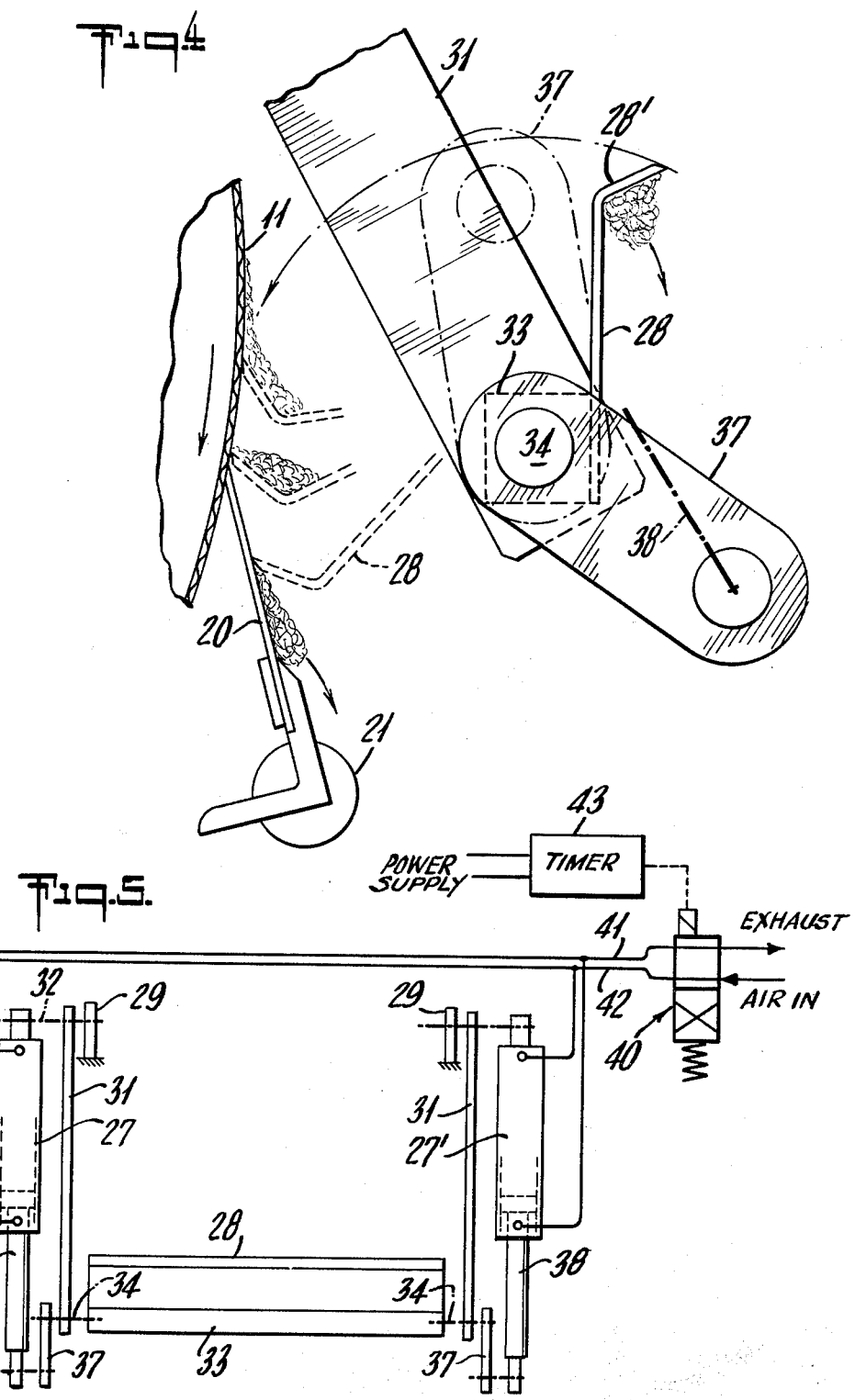

DOCTOR BLADE CLEANING METHOD AND APPARATUS

This invention relates to a method and apparatus for cleaning doctor blades utilized to remove solids from the surfaces of revolving cylinders, drums, rotating screens and the like and more specifically to a novel and improved doctor blade cleaning means and method of operation which not only removes material accumulated on and adhered to the surface of the doctor blade but also discharges removed solids to prevent accumulation thereof on the blade cleaner itself.

Doctor blades are utilized in a wide variety of applications such as the manufacture of paper and textiles and the treatment of industrial and municipal wastewater. For the purposes of this application, the invention will be described in connection with rotary screening apparatus used for the removal of solid and other materials from wastewater.

In the filtration of wastewater utilizing rotary screens, the wastewater is fed on to the outer surface of the screen which will retain solid materials and waste carried by the water and the filtered water flowing through the screen is then discharged. Since the filtered material adheres to the surface of the screen, a doctor blade riding against the surface of the screen functions to constantly scrape the filtered matter from the surface thereof so that a continuous filtering operation can be maintained. In the doctoring operation, it has been found that the filtered materials tend to adhere to and build up on the outer surface of the doctor blade and stringy materials often engage the edge of the doctor blade bearing against the drum with the result that the doctoring operation becomes inefficient and does not effectively remove the filtered materials from the surface of the drum or screen. While apparatus has been developed for the purpose of cleaning doctor blades periodically, such devices have not been found particularly effective in that the cleaning means while functioning to remove materials accumulating on the doctor blade do not provide for disposition thereof and thus the cleaning devices tend to accumulate waste materials removed from the doctor blade with the result that their effectiveness is materially reduced if not completely negated.

This invention resides in the provision of a novel and improved method and apparatus for periodically cleaning doctor blades wherein accumulated materials on the doctor blade are periodically removed and at the same time the doctor blade cleaner functions to discharge the removed materials to prevent accumulation on the cleaning means itself.

Still another object of the invention resides in the provision of a novel and improved device for cleaning doctor blades which is characterized by its effectiveness in the removal of accumulated materials from the doctor blade including string-like fibrous material that may have become wrapped about the leading edge of the blade and wherein the materials thus removed are immediately discharged by the cleaning means.

Another object of the invention resides in the provision of a novel and improved cleaning apparatus for a doctor blade which is characterized by its simplicity and ease of maintenance and which enables ready control of the pressure of the cleaning blade against the doctor blade and drum or screen so that the desired cleaning pressure can be achieved for a wide variety of applications.

A still further object of the invention resides in the provision of a novel and improved method and apparatus for cleaning doctor blades.

The doctor blade cleaning apparatus in accordance with the invention includes an elongated blade or scraper preferably in the form of a scoop which bears against the doctor blade and is periodically moved through an arcuate path to and from a position near the base of the doctor blade, over the width of the blade and then to a retracted position away from the blade. In the movement of the cleaning blade from the base of the doctor blade, the edge thereof moves over the surface of the doctor blade and a portion of the rotating drum in order to clean the doctor blade and remove fibrous material that may have been caught between the doctor blade and the drum. The cleaning blade then continues to rotate through an angle sufficient to cause the cleaning blade to discharge the material scooped from the doctor blade and the drum and discharge it at a retracted position.

The above and other objects and advantages of the invention will become more apparent from the following description and accompanying drawings forming part of this application.

IN THE DRAWINGS

FIG. 1 is a side elevational view of a rotary screen structure including a doctor blade and cleaning means for said doctor blade in accordance with the invention;

FIG. 2 is an enlarged fragmentary portion of FIG. 1 illustrating the doctor blade cleaning means in accordance with the invention;

FIG. 3 is a fragmentary side elevational view of the apparatus shown in FIG. 2 and taken along the line 3—3 thereof;

FIG. 4 is a diagrammatic view illustrating the operation of the doctor blade cleaning means in accordance with the invention;

FIG. 5 is a diagrammatic view of the doctor blade cleaning means as illustrated in the preceding figures and including means for periodically operating the cleaning means;

FIG. 6 is a diagrammatic view illustrating still another embodiment of doctor blade cleaning means in accordance with the invention; and FIG. 7 is a still further modified form of doctor blade cleaning means in accordance with the invention.

One embodiment of the invention for use in connection with rotary screening apparatus for the removal of solids and other materials from wastewater is illustrated in FIGS. 1 through 5. The rotary screening apparatus is generally denoted by the numeral 10 and includes a cylindrical rotary screen 11 carried by a shaft 13 coincident with the axis of the screen. The shaft is rotatably supported on a pair of frame elements of which only the frame 14 is illustrated. A motor 15 and speed reducer 16 are carried by the side frame 14 and function to rotate the shaft 13 and screen 11. End plates 17 and 17' extend upwardly from the frames 14 on each side of the rotary screen 11 to enclose the sides thereof. Wastewater W containing solids is fed to the screening apparatus 10 through an inlet pipe 18 coupled to the inlet housing 19 which extends between the side plates 17 and 17' as illustrated more clearly in FIG. 1. In normal operation as the drum 11 is rotated clockwise as viewed in FIG. 1, the liquid will seep through the screen and the solids will be retained on the outer side thereof for subsequent removal by the doctor blade 20 which rides against the surface of the drum and extends throughout the length thereof. The filtered water may be discharged through the bottom of the screen 11.

The doctor blade 20 extends throughout the length of the screen 11 and is carried by a shaft 21 rotatably supported by bearings 22 on each end thereof. A lever arm 22' extends inwardly from the shaft 21 at each end thereof and each arm 22' is coupled to a frame member 23 by a spring 24. This action maintains uniform pressure of the doctor blade 20 against the drum 11. An operating handle 25 is also coupled to the shaft 21 at each end thereof and permits the doctor blade to be tilted outwardly away from the drum or screen.

The doctor blade cleaning apparatus in accordance with the invention is generally denoted by the numeral 26 and in this embodiment of the invention includes cylinders 27 and 27' for controlling the operation of the cleaning blade 28 which extends throughout the length of the doctor blade 20. More specifically, the apparatus on each end of the rotary screen structure includes a bracket 29 secured to a transverse member 30 of the frame 14 and extends upwardly therefrom. A swing arm 31 is pivoted at 32 to an upper portion of the bracket 29 and extends downwardly and outwardly therefrom. The cleaning blade 28 is carried by an elongated shaft 33 (see FIG. 2) of rectangular configuration and has trunnions 34 extending from each end thereof which are rotatably received in cooperating openings in the lower ends of the swing arms 31. Adjustable stops 35 carried by the brackets 29 engage the swing arms 31 and limit the innermost positions of the two swing arms. A spring 36 connected between each swing arm 31 and the associated bracket 29 maintains the swing arm against the stop when the cleaning blade 28 is in the retracted position as shown in the drawings.

Rotation of the cleaning blade 28 and the supporting shaft 33 is effected by a pair of torque arms 37 each fixedly secured at one end to one of the shaft trunnions 34 and at the other end to the piston rod 38 of the pneumatically operated cylinder 27 (27'). The upper end of the cylinder 27 (27') is pivoted to the bracket 29 by the pivot pin 32 which also carries the swing arm 31.

With the arrangement as described above, when the piston rods 38 are in the extended position as shown in the drawings, the cleaning blade 28 will be essentially in an upright position and the swing arms 31 will rest against the stops 35. To clean the doctor blade 20, air is fed to the cylinders 27 and 27' to retract the piston rods 38. This action moves the torque arms 37 and the cleaning blade 28 in a counterclockwise direction as viewed in the drawings and particularly FIG. 4. The cleaning blade 28 is of L-shaped configuration with an offset end portion 28' and it will be observed that as the cleaning blade 28 approaches the screen 11 it will engage a small portion of the screen and move downwardly over the doctor blade 20. In moving downwardly over the doctor blade 20, material which has accumulated thereon will be removed through this downward motion as illustrated in FIG. 4. As soon as the cleaning blade 28 has achieved the lower most counterclockwise position, the cylinders 27 and 27' are then actuated to cause the piston rods 38 to move outwardly of the cylinders. This action reverses the motion of the cleaning blade 28 whereupon it will then move upwardly over the surface of the doctor blade 20 and upon approaching the edge of the doctor blade in contact with the screen 11, it will remove not only material accumulated on the doctor blade but will remove stringy materials which may have been folded about the end of the doctor blade. Continued movement of the cleaning blade 28 in a clockwise direction will cause it to engage a portion of the rotating screen 11 and material removed from the doctor blade and screen 11 will be accumulated and retained by the cleaning blade 28 as shown in FIG. 4. Upon movement of the cleaning blade 28 to the retracted position, the waste accumulated by the blade will automatically be discharged. When using a pneumatic or hydraulic cylinder for operation of the cleaning blade as described, it is possible to have an abrupt termination of motion both at the retracted position of the cleaning blade as well as the extreme counterclockwise position. These abrupt terminations will tend to throw waste material from the cleaning blade and thus prevent accumulations thereon which would interfere with the cleaning operation.

Operation of the pneumatic cylinders 27 and 27' may be accomplished in any desirable manner preferably by the utilization of appropriate timing means for actuation of the cylinders. One such system is illustrated in FIG. 5. In this figure, the cylinders are controlled by an electrically operated value 40 which controls the admission of pressure to one or other of the conduits 41 and 42 and opening the remaining conduits to the atmosphere for exhausting air pressure therein. In the instant embodiment of the invention, the conduit 42 is connected to the topside of each of the cylinders 27 and 27' while the conduit 41 is connected to the bottom sides of the cylinders. Normally air pressure is maintained on the conduit 42 to maintain the cleaning blade 28 in the retracted position. To move the blade 28 through the cleaning cycle, the timer 43 actuates the valve 40 to apply air pressure to the conduit 41 thus retracting the piston rods 38. After the expiration of a period of time sufficient to allow the cleaning blade 28 to be moved to its extreme counterclockwise position, the timer again operates the valve to apply pressure to the conduit 42 and open the conduit 41 to the atmosphere. This causes the piston rods 38 to move outwardly and thus bring the cleaning blade 28 to its extreme clockwise position as illustrated. Throughout the operation of the cleaning blade 28, the spring 36 functions to maintain a predetermined pressure of the cleaning blade against the screen 11 and the doctor blade 20 and during this procedure the swing arms 31 will tend to move outwardly from the stops 35. Thus the spring 36 determines the pressure of the cleaning blade against the screen 11 and the doctor blade 20 and the pressure can be controlled by changing the tension on the spring 36. Adjustment of spring tension may be accomplished by providing a plurality of openings 36' on each plate 29 for engagement by suitable spring fastening means such as a nut and bolt assembly generally denoted by the numeral 44 as shown more clearly in FIG. 2.

In the embodiment of the invention thus far described, it will be observed that each of the cylinders 27 and 27' and the associated swing arms 31 are pivoted about common points 32 and operation of the cylinders will not affect the contact force of the cleaning blade 28 normal to the surface of the drum and the doctor blade. This contact force will be dependent substantially solely upon the weight of the swing arms and associated components and the setting of the tension springs 36. In the embodiment of the invention illustrated in FIG. 6, the torque arm denoted by the numeral 37A inclines upwardly and to the left of the pivot 34 so that in a normal retracted position the torque arm 37A extends toward the drum 11 while in the preceding embodiment of the invention the torque arm 37 extended downwardly and to the right of the swing arm 3. With this arrangement, the cylinder 27 is in the retracted position when the cleaning blade 28 is also in the retracted position. In all other respects, the structure and operation corresponds generally to that illustrated in FIG. 1.

The structure in FIG. 6 however differs from that illustrated in FIG. 1 since the cylinder 27, when moving the cleaning blade 28 counterclockwise, pushes on the torque arm 37A and therefore increases the cleaning force of the blade 28 beyond that provided by the springs 36 and the weight of the swing arms and other components. Upon return of the cleaning blade 28 to the retracted position, the force exerted by the cleaning blade on the doctor blade 20 and the drum 11 will be that force produced by the springs 36 and the weight of the swing arms and associated components.

FIG. 7 illustrates still another modification of the invention and is identical to the structure illustrated in FIG. 1 with the exception that the upper ends of the cylinders are pivoted at points 32A which are spaced outwardly from the pivots 32. In as much as this form of the invention is otherwise identical to that illustrated in FIG. 1, like numerals have been utilized to denote like components. It will be observed in this embodiment of the invention however that the springs 36 are eliminated. Accordingly, when the cylinders 27 and 27' are operated to move the cleaning blade 28 from the retracted position counterclockwise, the cleaning blade will contact the surface of the drum and the doctor blade 20 with a pressure determined by the weight of the swing arms 31 and other component parts. However, when the cylinders 27 and 27' are activated to move the cleaning blade from its maximum counterclockwise position as illustrated in FIG. 7 to the retracted position, a secondary moment about the pivots 32 will be created since the cylinders 27 and 27' are acting through lever arms denoted by the letter L. This results in the application of a force normal to the drum and the doctor blade. The length of the lever arm L can be adjusted to obtain the desired contact force between the cleaning blade 28 and the doctor blade 20 and drum 11.

With the foregoing embodiments of the invention, it is clear that in the operation of the cleaning blade 28 it is moved in a counterclockwise direction as illustrated in the drawings to initially remove material accumulating on the doctor blade 20 and then upon movement of the cleaning blade 28 clockwise to the retracted position the cleaning blade scrapes the doctor blade 20 and also removes material that may be caught between the edge of the doctor blade and the drum 11. Moreover, in all of the embodiments of the invention the starting and stopping positions of the cleaning blade 28 are abrupt which functions to throw material from the surfaces of the cleaning blade and thus prevent accumulation thereon which would otherwise interfere with the cleaning operation of the cleaning blade. The foregoing embodiments of the invention also indicate various modes of operation to obtain the desired pressure contact of the cleaning blade with the doctor blade 20 and drum 11 in order to meet the requirements of specific applications.

While only certain embodiments of the invention have been illustrated and described, it is understood that alterations, changes and modifications may be made without departing from the true scope and spirit thereof.

What is claimed is:

1. Means for cleaning a doctor blade positioned in engagement with a rotating structure for the removal of solids from the surface thereof, said cleaning means comprising a cleaning blade extending lengthwise of said doctor blade and means for moving said cleaning blade transversely of said doctor blade through an arcuate path from one position in contact with said doctor blade, over the surface of said doctor blade to a second retracted position extending away from said doctor blade, said cleaning blade includes a fixedly positioned offset end portion extending toward the line of engagement of said doctor blade with said rotating structure when in said one position and said cleaning means includes means for periodically and arcuately moving said cleaning blade from said retracted position to and from said one position and means coupled to said moving means for urging the offset portion of said cleaning blade into pressure contact with said doctor blade.

2. Means for cleaning a doctor blade according to claim 1 wherein said cleaning blade has an essentially L-shaped cross section having a long leg and a short leg, said moving means comprises an elongated member pivoted for rotary movement, means securing the outer end portion of said long leg to said elongated member with said shorter leg extending in a direction toward the line of contact of said doctor blade with rotating structure when in said one position and spring means urging said cleaning blade into contact with said doctor blade.

3. Means for cleaning a doctor blade positioned in engagement with a rotating structure for the removal of solids from the surface thereof, said cleaning means comprising a cleaning blade extending lengthwise of said doctor blade and means for moving said cleaning blade transversely of said doctor blade through an arcuate path from one position in contact with said doctor blade, over the surface of said doctor blade to a second retracted position extending away from said doctor blade, said cleaning blade being normally in said retracted position and said cleaning means includes means for periodically and arcuately moving said cleaning blade from said retracted position to and from said one position, a pair of swing arms each pivoted at one end adjoining the edges of said rotating structure, said cleaning blade including means pivotally engaging the other end of each swing arm for rotation of said cleaning blade about the axis defined by said pivots, a torque arm fixedly connected at one end to at least one of said pivoted means and means engaging the other ends of said torque arms for moving said cleaning blade through an arcuate path between said retracted position and said one position.

4. Means for cleaning a doctor blade according to claim 3 including spring means reacting on said swing arms to urge said cleaning blade against said doctor blade during movement from said retracted position to said one position and return to said retracted position.

5. Means for cleaning a doctor blade according to claim 4 wherein said engaging means comprises fluid actuated cylinder and piston assemblies each connected between one end of the associated swing arm and the other end of the associated torque-arm and wherein said torque arms are angularly positioned relative to said cleaning blade to position said cleaning blade in the retracted position when said pistons are at the outer positions of the stroke.

6. Means for cleaning a doctor blade according to claim 4 wherein said engaging means comprises fluid actuated cylinder and piston assemblies connected between one end of the associated swing arm and the other end of the associated torque arm and wherein said torque arms are angularly positioned relative to said cleaning blade to position said cleaning blade in the retracted position when said piston is at the innermost position of its stroke.

7. Means for cleaning a doctor blade according to claim 3 wherein the last said engaging means comprises fluid actuated cylinder and piston assemblies each pivoted at one end at a point spaced from said one end of the associated swing arm and outwardly from said rotating structure and pivoted at the other end to the other end of the associated torque arm.

8. An apparatus having a rotating structure and a doctor blade having an edge portion engaging the surface of said rotating structure for the removal of solids therefrom, doctor blade cleaning means comprising a cleaning blade extending along the length of said doctor blade and having a fixedly positioned offset outer end portion, pivotal means for supporting said cleaning blade along one edge thereof for arcuate movement about an axis parallel to said doctor blade and means for periodically moving said cleaning blade from a retracted position extending away from said doctor blade through an arcuate path wherein the other edge of the cleaning blade moves into contact with and over the surface of said doctor blade until it reaches a position spaced from said edge portion thereof and then returns through the same path to the retracted position, means coupled to said pivotal means for urging said offset portion against said doctor blade and means for abruptly terminating the movement of the cleaning blade both in said retracted position and in said position spaced from the edge of said doctor blade to forceably discharge solids clinging to said cleaning blade.

9. Means for cleaning a doctor blade positioned in engagement with a rotating structure for the removal of solids from the surface thereof, said cleaning means comprising a cleaning blade extending lengthwise of said doctor blade and means for moving said cleaning blade transversely of said doctor blade through an arcuate path from one position in contact with said doctor blade, over the surface of said doctor blade to a second retracted position extending away from said doctor blade, said cleaning blade being normally in said retracted position and said cleaning means includes means for periodically and arcuately moving said cleaning blade from said retracted position to and from said one position, said cleaning blade having an essentially L-shaped cross section having a long leg and a short leg, said moving means comprises an elongated member pivoted for rotary movement, means securing the outer end portion of said long leg to said elongated member with said shorter leg extending in a direction toward the line of contact of said doctor blade with rotating structure when in said one position and means urging said cleaning blade into contact with said doctor blade, a pair of swing arms each pivoted at one end adjoining the edges of said rotating structure, said cleaning blade including means pivotally engaging the other end of each swing arm for rotation of said cleaning blade about the axis defined by said pivots, a torque arm fixedly connected at one end to at least one of said pivoted means and means engaging the other ends of said torque arms for moving said cleaning blade through an arcuate path between said retracted position and said one position.

10. The method of cleaning a doctor blade positioned in engagement with a rotating surface for the removal of solids from the surface of said blade comprising the steps of positioning a cleaning blade in substantially parallel relationship to said doctor blade with one edge in contact with said doctor blade and reciprocally moving said cleaning blade about an axis adjoining and parallel to the other edge of said cleaning blade to cause said cleaning blade to move through an arcuate path to and from a position away from said doctor blade to remove solids and other materials from said doctor blade, and abruptly terminating movement of said cleaning blade at each end of its movement through said path.

* * * * *